UNITED STATES PATENT OFFICE.

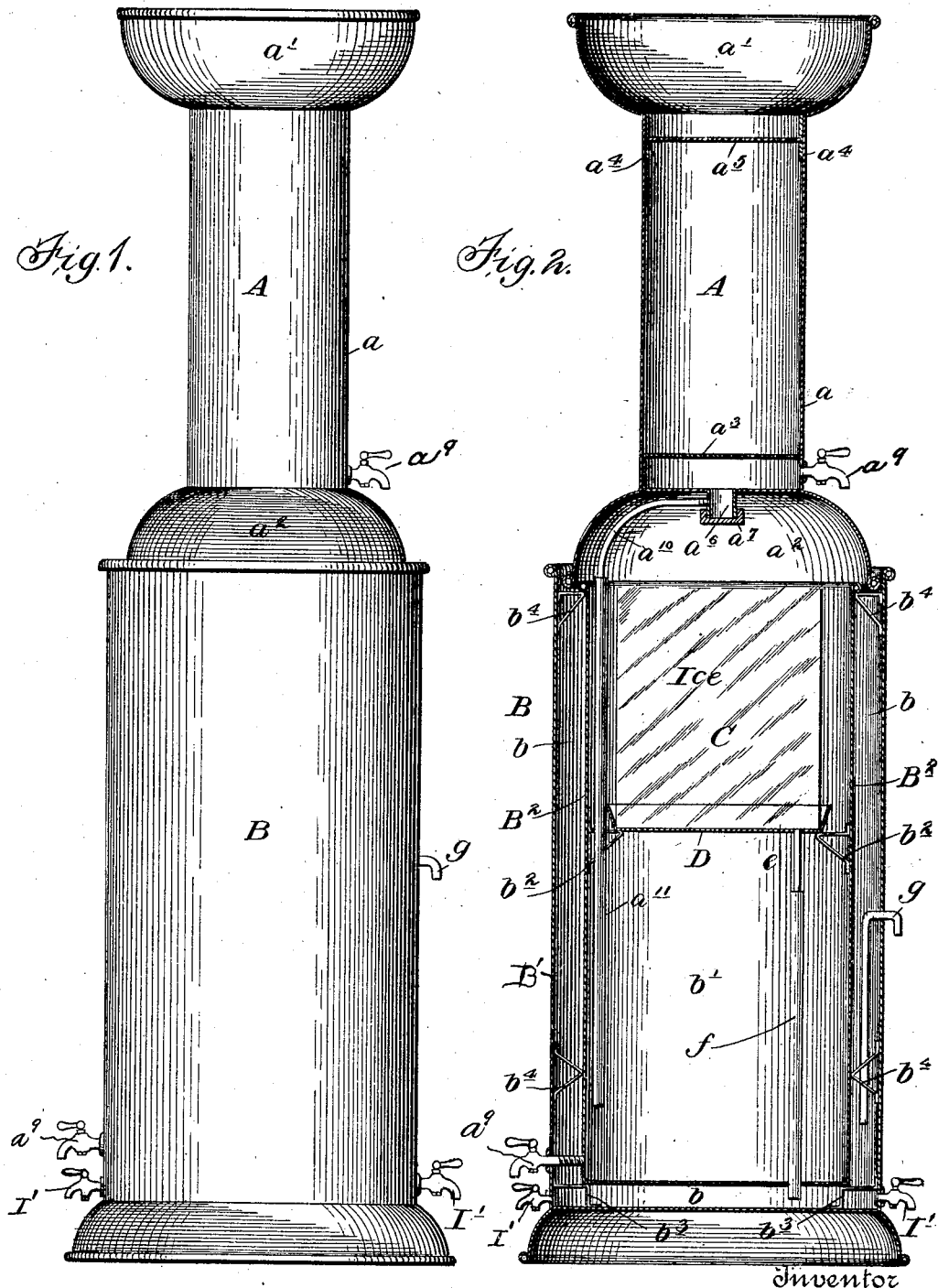

STANLEY S. MONTANYE, OF CANTON, PENNSYLVANIA.

WATER-COOLER.

No. 827,931. Specification of Letters Patent. Patented Aug. 7, 1906.

Application filed October 3, 1905. Serial No. 281,104.

*To all whom it may concern:*

Be it known that I, STANLEY S. MONTANYE, a citizen of the United States, residing at Canton, in the county of Bradford and State of Pennsylvania, have invented new and useful Improvements in Water-Coolers, of which the following is a specification.

My invention relates to a combined water-cooler; and it consists in the construction and arrangement of the several parts, which will be more fully hereinafter described, illustrated in the drawings, and particularly pointed out in the claim.

The objects of my invention are as follows: first, to provide a cooler which will receive the water, cool it, and keep it free from all contamination until it is used; second, to produce an apparatus which will be simple in construction, strong and durable, readily understood, and easily handled and managed. I accomplish these objects with the structure illustrated in the accompanying drawings, forming a part of this application, in which like letters of reference refer to similar parts.

Figure 1 is a side elevation of my cooler, and Fig. 2 is a vertical sectional view of the same.

Referring to the drawings, A represents the source of water-supply, and B the cooler, which are so constructed, arranged, and combined together as to form a combined and unitary structure.

The source of water-supply A is preferably cylindrical in form, as $a$, and has cup or basin shaped ends $a'$ and $a^2$. The ends $a'$ and $a^2$ are made cup or basin shape primarily, so that they may be adapted to hold a quantity of water, and, secondly, to adapt them to the cooler and make them reversible for purposes hereinafter mentioned. In the size of the source of water-supply I preferably use these basins $a'$ and $a^2$ may hold at one time from ten to twelve gallons of water. In the cylindrical body $a$ I secure near its lower end in any convenient manner a perforated screen $a^3$, and near the top of said cylinder I secure, by stops $a^4$, a screen $a^5$. The manner in which the screen $a^5$ is held in place is such as to permit of its being removed from the cylinder $a$ by giving it a half-turn and lifting it out of the stops $a^4$.

In the bottom of the cylinder $a$ is an opening in which is secured a short pipe $a^6$, which is normally closed by a cap $a^7$. A pipe $a^{10}$ is connected to the pipe $a^6$ and serves to convey the water from the source of water-supply A to the cooler B in a manner hereinafter explained.

The cooler B is preferably cylindrical in form and is arranged to receive and support the source of water-supply A, hereinbefore described, or any other suitable source of water-supply adapted to be used in connection therewith. This cooler consists of an outer case or shell B′ and an inner cylinder B². These cylinders B′ and B² are water-tight at their bottoms and throughout, except as hereinafter explained, for the purpose of keeping the water from the source of water-supply and the water from the melted ice from coming in direct contact.

Between the cylinders B′ and B² is a chamber $b$, and inside the walls of the cylinder B² is a chamber $b'$ to hold the water from the source of water-supply, the ice-pan, and the block of ice. The cylinder B² rests upon stops $b^3$ $b^3$ and is kept in vertical position by stops $b^4$ $b^4$.

The water from the source of water-supply A will pass into the cooler B through the pipes $a^{10}$ and $a^{11}$ and be collected in the chamber $b'$. C is an ice block, and D is the pan to sustain it, resting on the brackets $b^2$ $b^2$. The chamber $b$ is primarily open, containing only air; but in the ordinary use of the cooler B it becomes partly filled with water from an ice block C passing through the pipes $e$ and $f$ and collecting in the subchamber $b$. As the water continues to collect in the chamber $b$ it follows up the chamber $b$ and is discharged through the bent pipe $g$, thus cooling the chamber $b'$ and finally being discharged into any suitable vessel. The water may be discharged through the faucets I′ I′ as desired.

The block of ice C may be placed in the pan D by removing the source of water-supply A.

I do not limit myself to any particular size or form of cooler, as I contemplate making them of different sizes and forms.

Having thus described my invention, what I claim, and desire to secure by Letters Patent, is—

As an article of manufacture, a water-cooler comprising means for communicating with a source of water-supply, inner and outer non-communicating water-chambers, means for supporting a block of ice in the inner chamber, pipes for conducting water from the source of supply to the inner chamber, separate pipes for conducting the water from the ice block to the outer chamber, and means for drawing off the water from said chambers separately, substantially as described.

In testimony whereof I affix my signature in presence of two subscribing witnesses.

STANLEY S. MONTANYE.

Witnesses:
EDNA A. TEAGUE.
E. J. CLEVELAND.